United States Patent [19]
Cabrera-Montanté et al.

[11] 4,426,218
[45] Jan. 17, 1984

[54] MACHINE FOR HANDLING AND COOLING HOT GLASSWARES ARTICLES

[75] Inventors: Armando Cabrera-Montanté; José J. Ogushi-Perez, both of Monterrey, Mexico

[73] Assignee: Vitro Tec Fideicomiso, Monterrey, Mexico

[21] Appl. No.: 335,804

[22] Filed: Sep. 3, 1982

[51] Int. Cl.$^3$ ............................................... C03B 9/44
[52] U.S. Cl. ......................................... 65/241; 65/267
[58] Field of Search ................. 65/241, 260, 261, 264, 65/265

[56]  References Cited
U.S. PATENT DOCUMENTS

| | | | |
|---|---|---|---|
| 1,741,708 | 12/1929 | Milliken | 65/264 X |
| 2,609,943 | 9/1952 | Winder | 62/260 X |
| 3,175,704 | 3/1965 | McCreery | 65/260 X |
| 4,162,911 | 7/1979 | Mallory | 65/260 |

Primary Examiner—Arthur D. Kellogg
Attorney, Agent, or Firm—Charles R. Werner; William H. Maxwell

[57] ABSTRACT

An improved glassware article forming machine employing a hollow arm, one end of which is rigidly carried at the upper end of the vertical hollow shaft, the other end of each hollow arm being provided with a glassware article receiving chuck, and including mechanism for imparting vertical movement to the hollow shaft and associated arm, and mechanism for imparting oscillatory movement to the hollow shaft associated arm, and mechanism for supplying an adjustable amount of air through the hollow shaft and associated hollow arm for circulation into the chuck and about the hot glassware article received from a blow mold to provide an air cushion on which the glassware article will ride while providing cooling for said hot glassware article throughout its vertical and oscillatory movement to a takeout position.

9 Claims, 18 Drawing Figures

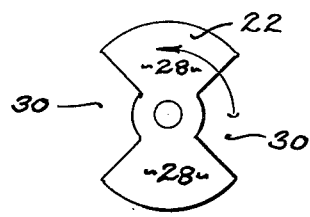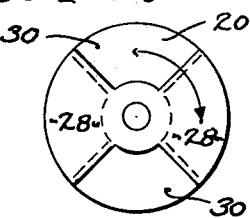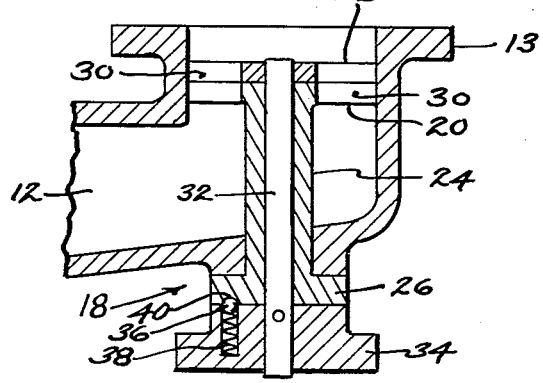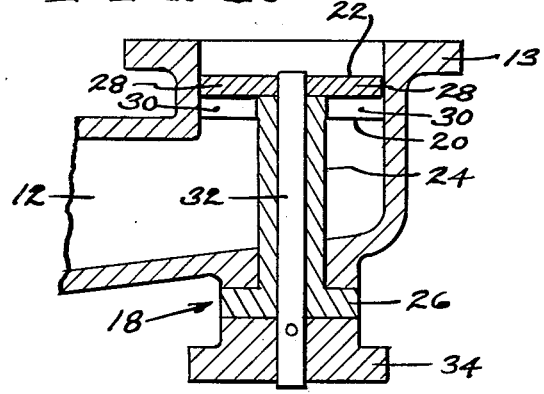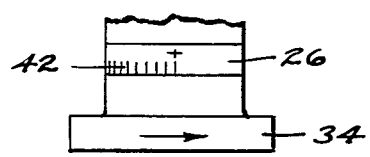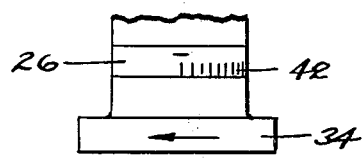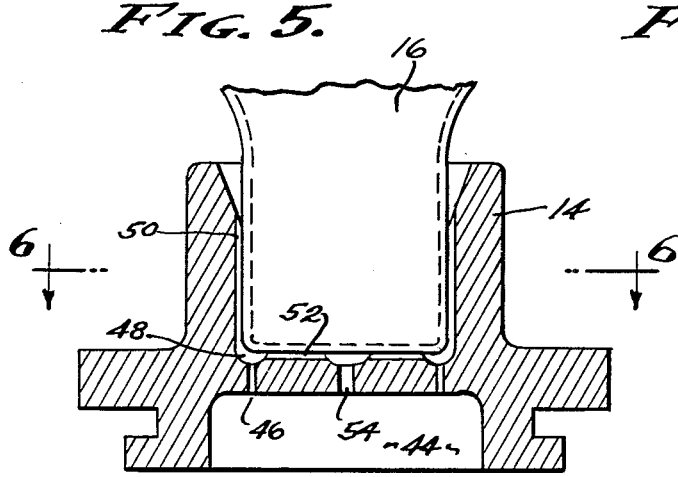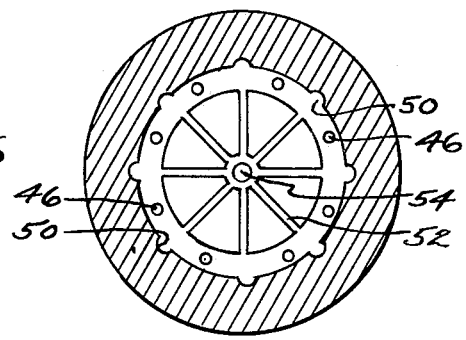

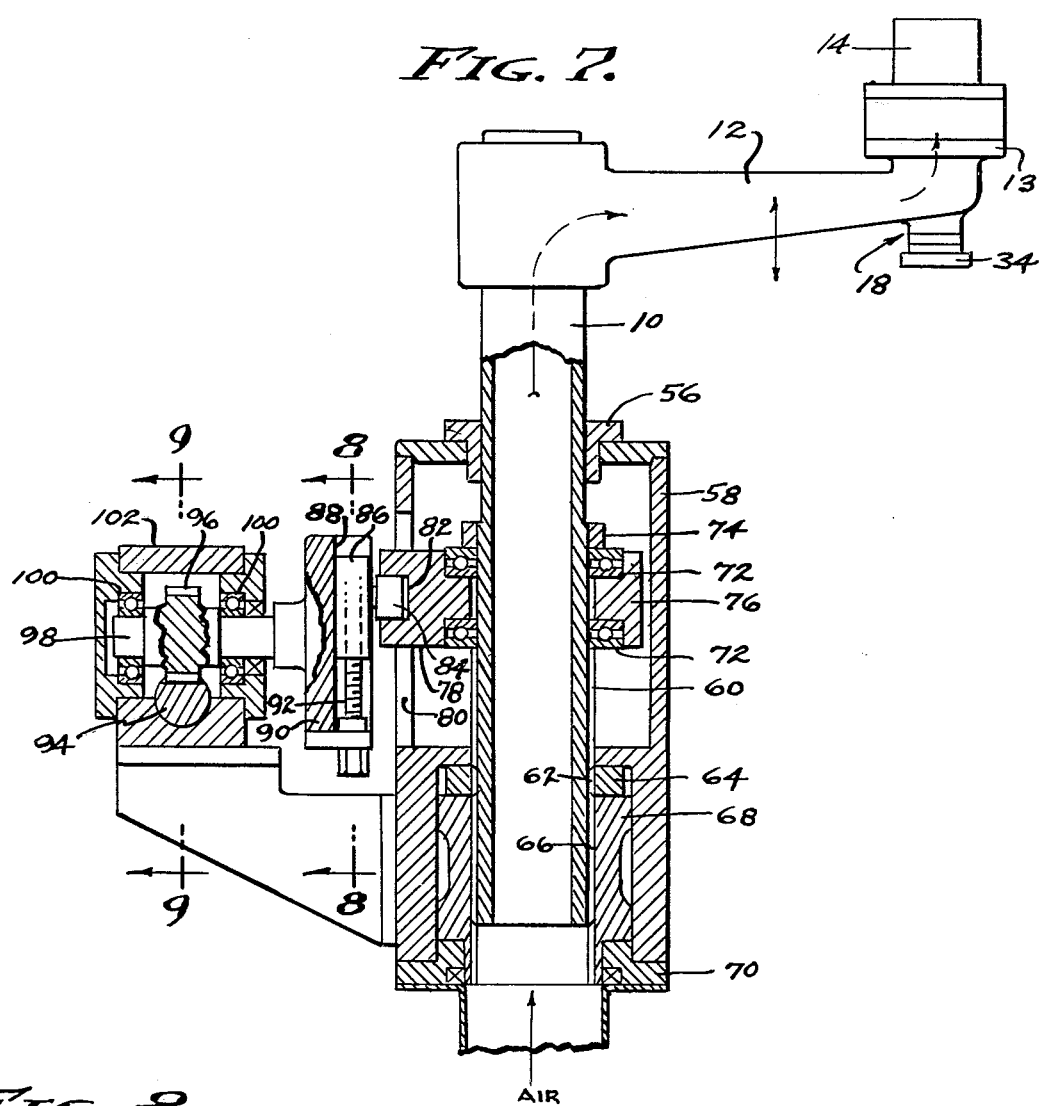
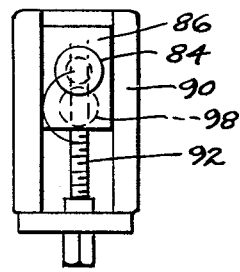
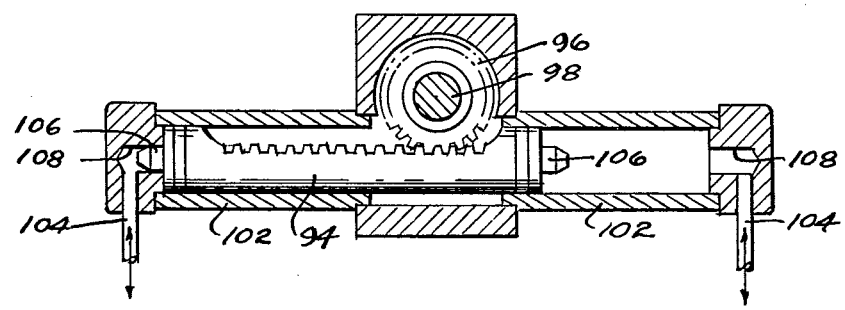

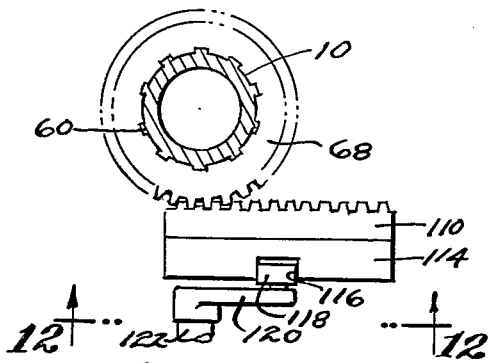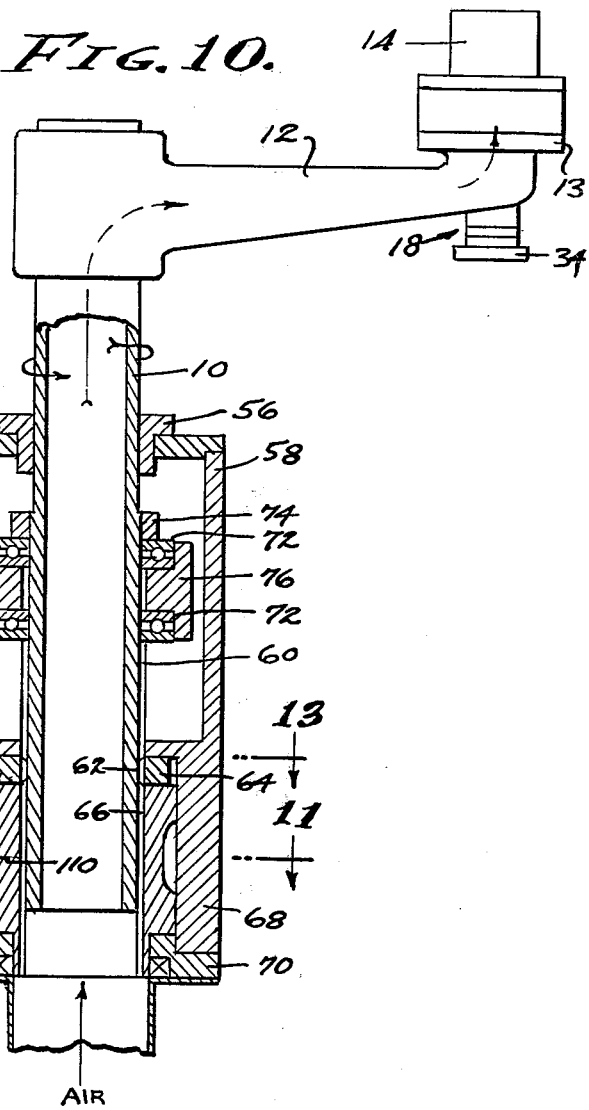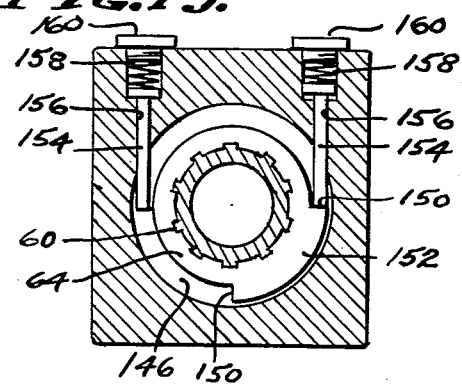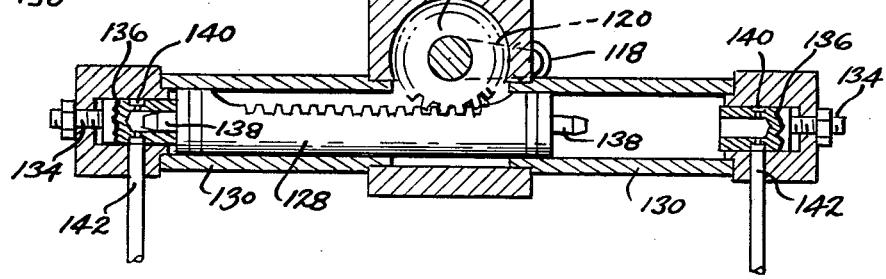

MACHINE FOR HANDLING AND COOLING HOT GLASSWARES ARTICLES

BACKGROUND

This invention relates in general to machines for forming glassware articles from molten glass or other materials and more particularly to the mechanism and operation of one section of the machine in which the hot glassware article is transferred from the blow or press mold to a cooling and takeout station and final conveyor away from the machine.

The patents in this art are extensive and varied. Cooling of glassware in glassware forming machines is not new. The constant goal is to produce the best possible quality in the finished product at a high rate of production and with the least amount of spoilage.

One of the problems encountered in prior art machines is the high percentage of deformation of glassware articles due to rapid takeout, improper release, lack of or insufficient cooling, and other improper handling during production, it being well understood that the manufacture of high quality glassware is an intricate and demanding art in which many factors result in substandard products and, conversely, desirable factors contribute to a better product.

The prior art also discloses multiple glassware article handling arms or carriers with multiple molds operating in synchronism, and therefore no claim is made herein to any broad concept of such an arrangement.

Accordingly, it is an object of the present invention to provide an improved assembly which can be termed a "carrier-cooling-takeout" stage which receives the hot glassware article from the blow mold, cooling the glassware article from the moment it is received and during its movement in the carrier to a takeout position, and depositing the cooled, finished glassware article on a conveyor of suitable construction or into a cutting off machine, said output equipment not being considered as elements in this specific disclosure.

Another object of our invention is to provide in a glassware article forming machine, article carrying arms which are actually mounted on their respective vertical shafts for alternately synchronized vertical and oscillating movement of said arms.

It is also an object of the invention to provide an improved glassware forming machine which includes adjustable means for changing the degree of vertical movement of the article carrying arms to accommodate the specific article of glassware being formed.

One more object of the invention is to provide an improved glassware forming machine in which a supply of air is supplied about the hot article received from the blow mold in a novel and specific pattern which will provide desirable cooling as well as forming a buoyant cushion on which the glassware article will be received and on which it will ride, the air cooling said glassware article will not cause any deformation of same.

It is another object of our invention to provide an improved glassware forming machine in which the article carrying arms and their respective vertical shafts are hollow and through which air is supplied from a suitable source and fed to the glassware article for providing the buoyant and cooling cushion.

It is one more object of our invention to provide an improved glassware forming machine in which adjustment means are employed to control the amount of air supplied to the glassware article received from the blow mold.

Another object of our invention is to provide an improved glassware forming machine in which sudden movements during oscillatory movement of the article carrying arms at the extremes of movement is minimized or eliminated completely in order to avoid possible deformation of the glassware article.

And still another object of our invention is to provide an improved glassware forming machine in which the article carrying arms each is capable of repetitive accurate 90° movement, in alternating timed relation with each other.

One more object of our invention is to provide an improved glassware forming machine in which optimum and continuing alternating movement is provided to the glassware article carrying arms whereby rapid and increased production of glassware is achieved.

SUMMARY OF THE INVENTION

The preceeding and other objects are achieved in our improved glassware article forming machine by employing a pair of spaced hollow arms, one end of each being rigidly carried at the upper end of its respective vertical hollow shaft, the other end of each hollow arm being provided with one or more glassware article receiving chucks, and including mechanism for imparting vertical movement to each hollow shaft and associated arm, and mechanism for imparting oscillatory movement to each hollow shaft with its associated arm, and means for supplying an adjustable amount of air through each hollow shaft and its associated hollow arm for maximum circulation about the hot glassware article received from the blow mold to provide a cushion on which the glassware article will ride as well as providing cooling for such glassware article throughout its vertical and oscillatory movement to a takeout position.

The foregoing and various other objects and features of this invention will be apparent and fully understood from the following detailed description of the typical preferred form and application thereof, throughout which description reference is made to the accompanying drawings.

DRAWINGS

FIG. 3 is an enlarged sectional view of a portion of FIG. 2 showing the end of the hollow arm and the air adjustment means and air inlet fully opened.

FIG. 3a is a plan view of the valve inlet elements adjusted as shown in FIG. 3; and FIG. 3b is a side elevation of the adjustment means for the valve inlet elements adjusted as shown in FIG. 3.

FIG. 4 is a view similar to FIG. 3 showing the air inlet fully closed.

FIG. 4a is a plan view of the valve inlet elements adjusted as shown in FIG. 4; and FIG. 4b is a side elevation of the adjustment means for the valve inlet elements adjusted as shown in FIG. 4.

FIG. 5 is an enlarged cross sectional view of the chuck for receiving the hot glassware article, illustrating the novel air circulation arrangement of our invention.

FIG. 6 is a sectional view taken as indicated by line 6—6 on FIG. 5.

FIG. 7 is a detailed vertical sectional view taken as indicated by line 7—7 on FIG. 1, of the hollow vertical shaft, its supporting element and details of the mechanism for imparting vertical movement to said shaft, as well as a portion of the mechanism for imparting oscillatory movement to the shaft and hollow arm which is shown in elevation.

FIG. 8 is a detailed view taken as indicated by line 8—8 on FIG. 7, illustrating the eccentric which connects to the hollow vertical shaft.

FIG. 9 is a detailed sectional view taken as indicated by line 9—9 on FIG. 7, illustrating the rack and pinion drive mechanism for imparting vertical movement to the hollow shaft and its attached hollow arm.

FIG. 10 is a vertical sectional view, similar to FIG. 7, of the entire assembly and including the rack and pinion drive for imparting oscillatory movement to the hollow shaft with its attached hollow arm.

FIG. 11 is a fragmentary plan sectional view removed from FIG. 10 and showing the hollow shaft oscillating gear in engagement with a rack moved by rocker arm and follower roller, the hollow vertical shaft being shown in section and indicating its splined relation with the oscillating gear.

FIG. 12 is a fragmentary elevational sectional view removed from FIG. 10 and showing the follower roller on its rocker arm and grooved rack which is reciprocated by the rocker arm and roller.

FIG. 13 is a sectional view taken as indicated by line 13—13 on FIG. 10 illustrating the mechanism for a backlash eliminator utilized at the end of the oscillatory movement of the hollow shaft and its attached hollow arm.

FIG. 14 is a cross sectional view on the line 14—14 on FIG. 10, with parts being shown in elevation, illustrating the rack and pinion for imparting oscillatory movement to the hollow shaft with the attached hollow arm, and adjustment means to properly position the chuck at the precise position for receiving the hot glassware article from the blow mold.

PREFERRED EMBODIMENT

Figure 1:
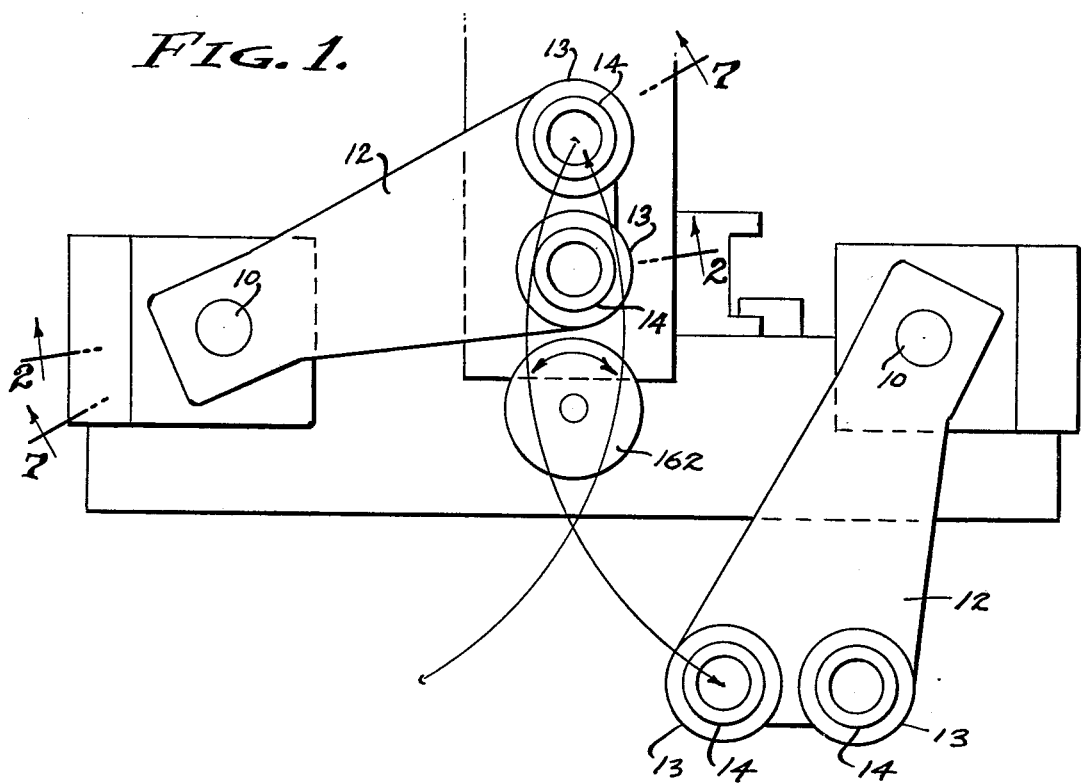
FIG. 1 is a plan view of a pair of reciprocally mounted hollow arms for receiving hot glassware articles from a blow mold (not shown) and for movement to a takeout position and mechanism (not shown).

Referring now to the drawings by numerals of reference, each spaced hollow vertical shaft 10 carries a hollow horizontal arm 12 which can properly be called "a glassware article carrier-cooling-takeout arm", said arm being rigidly secured by one of its ends to the upper end of the hollow vertical shaft 10, and its other enlarged end 13 opposite the hollow vertical shaft 10 carries two articles supporting and cooling chucks 14 in which hot glassware articles 16 may be received from a blow mold.

COOL AIR DISTRIBUTION

One of the several novel features of the glassware article supporting and cooling chucks 14 is shown in FIGS. 2-6 and is directed to the novel arrangement for distributing cooling air about the hot glassware article 16 to provide buoyancy by a cushion of air on which the glassware article rides, as well as providing desired distribution of cooling air about the glassware article thus resulting in a more perfectly formed finished product. Also provided is an adjustable air supply valve 18 for controlling the amount of air being supplied to the glassware article in accordance with the specific demand for the type of article being manufactured. The valve 18 comprises a pair of plates 20 and 22, the first plate being stationary and fixed to a vertical guide 24 which is rigidly carried in the body of the hollow horizontal arm 12 and is provided with flanged bottom 26. Both the stationary and movable plates 20 and 22 have opposite pie-shaped portions 28 and opposite cutaway portions 30 (see FIGS. 3 and 4), said movable plate 22 being carried by the stem 32 which is rotatably mounted in the vertical guide 24 and has fixed to its lower end an adjustment knob 34, a spring-urged ball 36 contained in recess 38, said ball being urged into any one of a series of indentations 40 in the lower surface of flange 26 for maintaning the valve adjustment knob in adjusted position. A position index 42 may be located on the peripheral surface of the flange 26.

The glassware article supporting and cooling chuck 14 is mounted at the end 13 of the hollow horizontal arm 12 in a normal manner and a chamber 44 is formed therebetween. As seen in FIGS. 5 and 6 there are located a plurality of peripheral conduits 46 leading into a peripheral recess 48, vertical recesses 50 being spaced about the inner surface of the glassware article supporting and cooling chuck 14, and radially extending recesses 52 lead from a central conduit 54 to the peripheral recesses 48, providing by said arrangement of conduits and recesses desired and equal distribution of cooling air to attain the most efficient cooling of the glassware article received from the blow mold to eliminate or minimize the chances of imperfections of malformations which could be caused by unequal cooling. Also, the cooling air supply provides a cushion of air on which the glassware article rides and thus eliminates contact with or impact thereof against the metal of the supporting and cooling chuck.

VERTICAL HOLLOW SHAFT ACTUATION (A) Vertical movement:

As shown in FIGS. 7 to 9, each vertical hollow shaft 10 is slidably and rotatably carried in a bushing 56 mounted at the upper end of its respective housing 58 which is a fixed element of the glassware article forming machine (not shown). A portion of the vertical hollow shaft 10 is splined as at 60 and rides in grooves 62 of a backlash eliminator 64 and grooves 66 in a gear 68, a retainer 70 at the bottom end of housing 58 retaining the internal parts of the housing in place. The details of construction and purpose of the backlash eliminator 64 will be described hereinafter.

As shown in FIG. 7, midway of the hollow vertical shaft 10 are located spaced bearings 72 held in place by nut 74, between said bearings being located an annular actuator 76 having an extension 78 which is positioned in vertical slot 80 formed in the housing 58, the extension 78 being provided with a horizontal groove 82 in which a rotative follower 84 is positioned, said follower being carried by an adjustable block 86 slidably movable in a groove 88 of block retainer 90, adjustment being accomplished by screw 92 threadedly engaging block 86. (See FIGS. 7 and 8). The block retainer 90 with rotative follower 84 are reciprocated by means of a piston type rack 94 and pinion 96 on shaft 98 suitably mounted in bearings 100 in housing 102, said rack and pinion being hydraulically or pneumatically actuated through inlets 104 in housing 102. The reduced plungers 106 operate in recesses 108 at each end of the housing 102 to act as shock absorbers at each reciprocal stroke of the piston type rack 94. To clarify the description of the vertical movement of the vertical hollow shaft actuating mechanism, it is emphasized that it is necessary to precisely vertically position the chuck 14 according to the size and shape of the hot glassware article received from the blow mold in order that the article is delivered properly in its vertical reception on the cushion of air in the chuck to avoid deformation or impact while in a heated condition. If not properly centered, the glassware article, although molded in its exact finished form in the blow mold, when in a heated and still relatively fluid condition could easily be deformed if there is even the slightest deviation in its reception by the chuck. Therefore, we deem this mechanism and its adjustment feature of extremely vital importance in the novel concept of our invention.

(B) Oscillatory movement:

In FIGS. 10 to 14 we have illustrated the mechanism which controls the oscillatory movement of the glassware article carrier-cooling-takeout arms 12, identical mechanism being used for each arm. The gear 68 which is connected by splines 60 in grooves 62 to the hollow vertical shaft 10 is contacted by rack 110 horizontally movable in a recess in housing 58. The rack 110 is formed in the block 114 (see FIG. 11) in which a vertical groove 116 is provided, a roller type follower 118 being carried by arm 120 and positioned in said groove 116. The arm 120 is mounted on shaft 122 carried by bearings 124 and is fixed in pinion 126 which is engaged by rack 128 in the form of a piston which operates within cylindrical housings 130, extending from housing 132 in which are located the block 114, follower 118, arm 120, shaft 122, bearings 124, pinion 126, and rack 128. The rack 128 and pinion 126 are so designed that an accurate 90° oscillatory movement in a horizontal plane can be imparted to the glassware article carrier and cooling hollow arm 12. However, this degree of movement and specifically the exact positioning of the chucks on the end 13 of the hollow arm 12 can be adjusted by means of threaded elements 134 positioned at the ends of the cylindrical housings 130, said threaded elements 134 providing means for adjusting the position of the internally recessed members 136 in which are received the spear 138 of rack piston 128 for dampening the movement of said rack piston at their extremes of movement and thus eliminating impact to the glassware articles 16 in the chuck 14. Annular apertures 140 are provided about the internally recessed members 136 which connect with apertures 142 through which can be supplied a hydraulic or pneumatic source for actuating the rack piston.

The backlash eliminating mechanism 64 is shown in FIG. 13, and includes the housing 58 in which is located a chamber 146, concentric with the hollow vertical shaft 10. A segmental stop element 152 is splined to the hollow shaft 10, with the two stop faces 150 on the projecting segment, said stop faces being approximately 90° apart. Spaced contact pins 154 are mounted in apertures 156 in the housing 58 and are normally urged into their apertures by springs 158 held in place by suitable retaining members 160. As the hollow vertical shaft 10 is oscillated the stop faces 150 will contact the respective pins 154 working against the springs 158 and thus prevent any backlash to the drive system and consequently to the glassware article which could occur if such spring urged pins and stops were not provided.

As an additional aid to initial vertical adjustment of the entire mechanism comprising our novel invention we have provided a hand wheel 162 which turns a threaded element to raise or lower the entire structure carrying the hollow arms. (See FIG. 1).

OPERATION

Although the description of the elements of our invention conveys a comprehensive indication as to the function of the various components and their interrelation, it is believed that a different approach to indicate the precise operation and function of our invention would better enable one skilled in the art to more clearly understand the advantages, novelty and greatly improved results which are achieved. In the art of forming glassware articles a number of steps are involved and many improvements have been made in many of these steps. In the blow mold phase the glassware article has achieved its final finished form but is still extremely hot and relatively fluid in which event a number of factors could affect said hot glassware article whereby it could still be deformed or rendered faulty prior to removal from the glassware article forming machine. As should now be obvious, our invention provides for receiving the hot glassware article from the blow mold and cooling it in such a manner that its precise shape as received from the blow mold is retained and it is delivered to a conveyor or the like for final removal from the glassware article forming machine. In addition to improving the quality of the finished glassware article out invention increases production by the novel arrangement of parts.

Referring now to the precise operation, the hot glassware article 16 is received in the chuck 14 from the blow mold portion of the machine (not shown) by two movements of the hollow horizontal positioning or takeout arm 12, one movement comprising pivotally swinging the hollow arm 12 with its plurality of chucks 14 to a position precisely below where the glassware article 16 is to be received from the blow mold, said positioning being accomplished by rack 110 engaging gear 68 in which hollow shaft 10 is splined, the rack 110 being moved in rectilinear direction by roller 118 in vertical groove 116, said roller being carried on arm 120 mounted on suitably journaled shaft 122 which carries pinion 126 in engagement with rack piston 128, said piston being hydraulically or pneumatically operated in synchronism with the other functions of the glassware article forming machine. The precise positioning of the chucks in a horizontal plane is accomplished by adjustment of threaded elements 134 at the ends of the rack piston housing 130.

The second movement which is imparted to the horizontal psoitioning and takeout arm 12 is a vertical movement which is accomplished by rack 94 hydraulically or pneumatically actuated and pinion 96, also synchronized with the other functions of the machine, said pinion imparting oscillating movement to shaft 98 to rock rotary follower 84 operating in groove 82 of actuator 76 in which the splined shaft 10 can freely rotate by means of two sets of bearings 72 fixed to the shaft will provide for vertical movement of said shaft upon actuation of the rotary follower 84. The amount of vertical movement can be adjusted by screw 92 and this adjustment is made each time a new piece of glassware article is to be fabricated by the machine, whereby precise reception of the hot glassware articles from the blow mold to the chuck is achieved prior to actual startup of the machine for production.

Although essential to the proper functioning of our invention but not specifically described herein simply because it could be old in the art or susceptible of inventive material apart from the present invention, synchronising or timing means which could be mechanical or electronic, or any other suitable form are employed in order that the oscillatory as well as vertical movement of the positioning and takeout arm 12 are precisely timed with the movement of the blow mold whereby the hot articles received from the blow mold, of which there may be several functioning at one time, will be received by the chuck in perfect alignment therewith as well as in perfect vertical introduction into the chuck. It is well understood in the art that such chucks are interchangeable according to the size and shape of the glassware article being fabricated.

Figure 2:
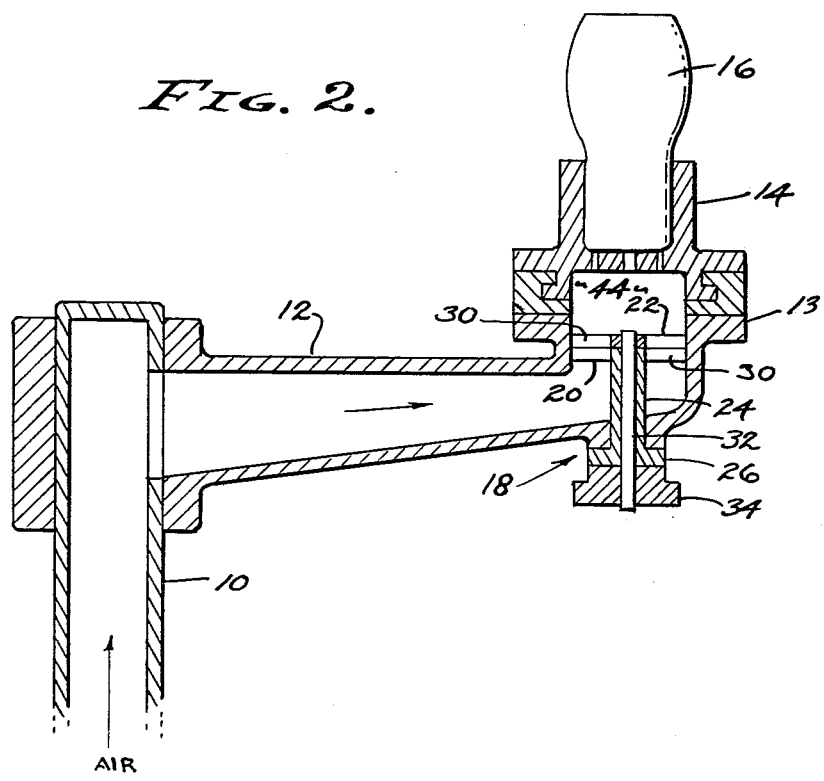
FIG. 2 is a vertical cross sectional view through one of the hollow arms and a fragmentary portion of the hollow vertical actuating shaft for said arm, taken as indicated by line 2—2 on FIG. 1, and illustrating the glassware article supporting chuck and the adjustable air supply.

The function and operation of the adjustable air supply valve 18 as shown in FIGS. 2, 3, and 4, and the backlash eliminator 64 as shown in FIG. 13, have been amply indicated in the description. To repeat, precisely the correct amount and velocity of air must be introduced to the chuck 14 to cause the hot glassware article to float on a cushion of air when sufficient air is evenly distributed to cool the glassware article at the same rate about its entire surface so that no deformity can occur due to uneven cooling in certain portions. This is an extremely important feature in the production of quality glassware.

It must also be emphasized that cooling of the glassware article can be timed whereby such cooling continues while the horizontal positioning and takeout arm 12 is moving from glassware article receiving position to glassware article takeout position. This feature is considered one of the important points of novelty in our invention as it contributes to increased production by shortening the time from article receiving to article takeout. With two separate assemblies working simultaneously and alternately in precisely the same manner, production rate is greatly increased.

Having described only a typical preferred form and application of our invention, we do not wish to be limited or restricted to the specific details herein set forth, but which to reserve to ourselves any modifications or variations that may appear to those skilled in the art as set forth within the limits of the following claims.

We claim:

1. In a machine for forming glassware articles and the like, the combination which includes press and blow molds in which hot glassware articles are produced in finished form, including a horizontal arm receiving the hot glassware articles from the molds, a rotatable and vertically movable shaft carrying said arm, said arm and vertical shaft being hollow and in communication with each other, means for imparting rotation to said shaft and arm carried thereby, means imparting vertical movement to the shaft and the arm carried thereby, and means supplying air under pressure through said shaft and arm to cool the hot glassware articles received by the arm.

2. The machine for forming glassware articles as set forth in claim 1, wherein said arm has a vertically open glassware article supporting and cooling chuck with air conduction conduits opening therein from said arm and providing a bouyant air cushion for support of the hot glassware articles while cooling the same.

3. The machine for forming glassware articles as set forth in claim 2, wherein means controls the pressure and velocity of the air supplied through the shaft and arm and conduits into the chuck.

4. The machine for forming glassware articles as set forth in claim 2, wherein adjustable valve means controls the supply of air through the air conducting conduits opening into the chuck for providing the bouyancy and cooling of the hot glassware articles received in the chuck.

5. The machine for forming glassware articles as set forth in claim 2, wherein the glassware article supporting and cooling chuck comprises peripheral conduits leading into a peripheral recess, vertical recesses spaced about an inner surface of said chuck, and radially extending recesses leading from a central conduit to the peripheral recess, for maintaining an even distribution of air flow through said chuck and for cooling and floating said hot glassware articles on an air cushion for avoiding contour deformation thereof.

6. The machine for forming glassware articles as set forth in claim 2, wherein the means for imparting rotation to said shaft and arm carried thereby and for imparting vertical movement to said shaft and arm carried thereby includes decelerating means for minimizing the sudden movements to the hot glassware articles at the ends of movement thereof, and thereby avoiding deformation of the hot glassware articles while cooling.

7. The machine for forming glassware articles as set forth in claim 2, wherein means adjusts the vertical movement at said shaft and arm carried thereby in accordance with the height of the hot glassware articles which are being handled thereby, and means for adjusting the angular displacement of the rotating motion of the shaft and arm carried thereby, all in accordance with the required receiving and withdrawal positions of said hot glassware articles.

8. The machine for forming glassware articles as set forth in claim 7, wherein said means adjusting vertical movement and said means adjusting the angular displacement includes means for synchronizing the vertical movement and rotation of the said shaft and arm supported thereby.

9. The machine for forming glassware articles as set forth in claim 7, wherein said means adjusting vertical movement and said means adjusting the angular displacement includes means for receiving the hot glassware articles just when the molds of the machine are in open position releasing a newly formed hot glassware article.

* * * * *